No Printed Specification Available
8517X
W. C. Grimes,
Brick Machine,
Patented Dec. 2, 1834.
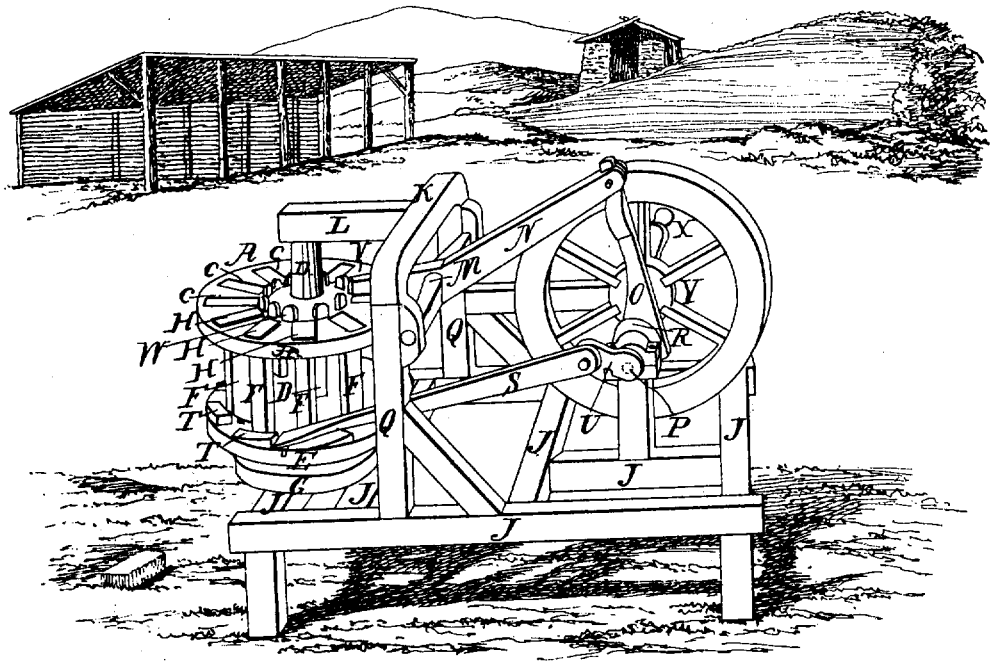
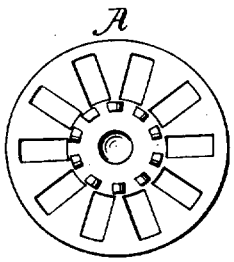
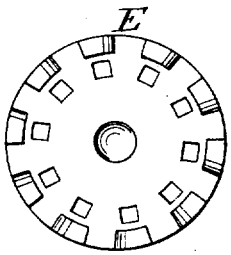
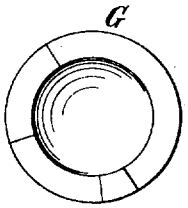
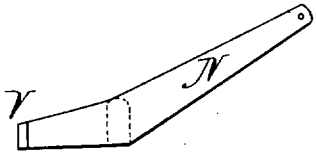
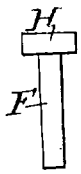
AM. PHOTO-LITHO. CO. N.Y. (OSBORNE'S PROCESS)

Dec. 2. 1834

85177X William C. Grimes of York, Pennsylvania

Letters Patent.

The Schedule referred to in these Letters Patent and making part of the same, containing a description in the words of the said William C. Grimes himself of his improvement in a machine for Moulding Brick.

To all to whom these presents shall come
Be it known that I William C. Grimes of York in the County of York and State of Pennsylvania, have invented a new and useful Machine for Moulding Bricks and that the following is a full and exact description of the construction and operation of the said Machine, reference being had to the accompanying drawing which makes a part of this Specification.
This Machine is constructed upon the following general principles. A wheel is affixed Horizontally to, and revolves with an upright shaft, the latter being properly supported above and below, by a suitable step and box, in which its gudgeons turn. The moulds in which the bricks are to be formed, are placed around and upon the face or upper side of the wheel, near its periphery. These may stand in the direction of radii, from the centre of the wheel, or otherwise, and two or more Moulds may be united or connected together. A hopper or trough of sufficient capacity is placed in an inclined position with its lower end over the wheel and over one or more of the moulds, as they pass under it. This hopper is to contain the tempered clay of which the bricks are to be made, and through that part of the bottom of it, which projects over the mould, or moulds, a hole or holes, an opening or openings, are made of the length and width of a brick, through which the clay is to descend into the moulds. The motion of the wheel is not to be continuous, but intermitting; while it is at rest a mould is immediately beneath the opening in

C. B.

in the bottom of the hopper or trough, and the clay is then forced
by a piston down into it; the piston then rises and the wheel
moves, and the moulds are thus filled in succession. As the
filled moulds pass round upon the wheel they are removed,
and replaced by empty ones. It is manifest that two or more
moulds may be filled at the same time, by the use of two or
more openings and pistons, and the employment of such other
devices, as may thereby be rendered necessary sufficient power
being applied for that purpose. The wheel A receives its ir=
regular or intermitting motion from the crank N. to which is
attached to the pall or ratchet C. that takes into the teeth D.D.
affixed for that purpose, to the periphery of the wheel A; these
teeth are to be equidistant from each other, and to correspond in
number with the moulds E,E,E, upon the wheel A. The num
ber of the moulds will depend upon the diameter of the
diameter of the wheel, which will admit of considerable
variation, but from four to six feet I think the most convenient
The moulds must be slightly attached to the face of the wheel,
which may be done in various ways, the following being
among the best. from the underside of the moulds, project
two dowell pins; which fit into corresponding holes in
the face of the wheel, by which means the moulds are kept
from any lateral or horizontal movement; the dowel pins
should be short, so that the moulds may be readily disen=
gaged from the wheel. the holes for the pins or dowels in the
face of the wheel should be pierced through it so as to prevent
them from being filled or choaked with dirt &c. Two or more
moulds may be united in one frame as is usual in Brick Moulds
The outframes of the moulds, are inclined from each other, like key
stones, so as to stand as radii from the centre of the wheel, thus
forming the proper arch or curvature around the wheel; and
their upper surfaces should form a true plane. Each frame of
moulds should have a thin plate or board F. which is equal
in length in length and breadth to it corresponding frame, and forms the bottom
or bed of the moulds, the aforesaid dowell pins pass loose thro' holes made
for that purpose in this plate the latter not being otherwise fastened to the moulds.
its use will be apparent to any one acquainted with the usual mode of
moulding bricks. The trough or hopper G. which is to contain the tempered
clay, should have its sides very much inclined, thereby narrowing its
bottom. that part of the bottom of the trough which lies over the moulds,
should consist of metal, or be faced with it around the opening. the
bottom of the trough around the aforesaid opening, is not a part of the
plane of the bottom, but consists of four planes, each commencing at
its respective side of the opening, and rising at an angle, of some three
or four degrees from the horizon, in the form of a shallow hopper (see
Fig 1.2.3.) inside of the trough or hopper, the bottom is chamfered
off, around and down into the opening, so that the edge of the opening
is reduced to about one eighth of an inch in thickness H Fig 2. this allows
all the surplus clay to flow or pass out laterally from beneath the piston
as it passes down almost to the moulds. the thin or champhered
edge answering also to strike or smooth the upper side of the brick,
as it passes from beneath the opening. The wheel A. which carries
the moulds, turns just above and at one end of a low oblong frame
I. upon which there are suitable cross pieces to support the trough or
hopper I. upon the other or opposite end of the said oblong frame,
is affixed a fly wheel K. and shaft L; the length of the latter being
about half the width of the frame I. upon which it is supported.
upon each end of the shaft L. and outside of its bearings or jour=
nals, is affixed a crank M. and another N: the crank M. not seen
in the d[illegible]wing, gives motion to the piston O. and is about midway
across the frame; the crank N. is outside of the frame and gives mo=
tion to the Mould wheel A. by the pall or ratchet C. crank N. describes a
circle somewhat greater in diameter than the distance between
two contiguous teeth on the periphery of the mould wheel; hence the
ratchet passes over but one tooth in each revolution of the crank,
thus giving the requisite motion to the mould wheel, and causing
it it always to stop with one of the moulds directly beneath, and
corresponding with the before described opening in the bottom of
the trough, or hopper, being held there by a ratchet. The crank M. gives
a vertical motion to the piston O. in the following manner. Two up=
right posts Y.Y. standing one upon each side of, and about midway
between the ends of the frame I. have their upper ends framed into
a suitable cross piece, to keep them in their relative position, they
may rise to the height of four or five feet (more or less) above the top
of the frame. A beam or shaft R. with round tenons or gudgeons
upon its ends, crosses from one to the other of the upright posts YY.
there being suitable boxes near the upper ends of the posts for the
gudgeons of the said shaft to turn in. The shaft R. is a support and
fulcrum to the balance beam S. which is affixed to it, at right angles,
the beam lies in a horizontal position, and to one end of it is jointed, the
upper end of the shackle bar T. which is connected below to the crank
M: to the other end of the beam is jointed the rod or stem of the
piston O. which passes down through the piece U. fixed across the
top of the trough or hopper; serving to guide the piston to the moulds
below. Near that end of the beam to which the shackle bar is
jointed, an arm V. is framed into its under side, which is to be
firmly braced to it, and descend near to the most elevated
end of the trough or hopper; to the lower end of this arm is jointed
a feeder shaft W. which lies in an inclined position with its
feeder resting upon the inclined bottom of the trough or hopper. Now
it will be perceived that as the vertical piston O. rises and falls,
the feeder with the inclined shaft W. will have a movement
nearly horizontal upon the bottom of the trough. As the vertical
piston O. rises, the feeder which rests upon the bottom of the
trough, approaches the aforesaid opening above the moulds (and
vice versa) the object of which is to force the clay beneath the
vertical piston. The Machine may receive its motion from a
strap, carried around the fly-wheel, and over a drum or pulley,
which last may be driven by any competent power. or the Machine
may 8317X 2 may receive its motion by a crank attached to the fly wheel shaft, or in any other convenient mode. I do not mean to confine myself to the peculiar form or arrangement of the parts, as before specified, but to vary them as experience or convenience may dictate; whilst the general principle remains unchanged.

What I claim as new, and as my invention, and for which I ask Letters patent is.- 1st. The moulding of brick upon, or in Moulds upon the face of a revolving horizontal wheel, disc, or rim, constructed and acting upon the principle herein specified.

2nd. The manner of forcing the clay into the moulds by the combined action of a feeder and piston. 3rd. The general construction and combination of the respective parts of the above described machine, from which general combination it derives that character by which it will be readily distinguished by any competent machinist from the various machines for moulding bricks already in use. And I hereby declare that I do not intend to claim as my invention, the piston, crank, hopper, or any other part of the said machine taken separately and individually, as these may constitute the elements of other Machines; but as aforesaid, the construction and combination of these parts upon the principle by me devised, and herein fully exemplified.

Witnefses
Robt Clarke
Ebenezer Talbot

William C. Grimes

Drawing

1937 Words]